(12) United States Patent
Mizutani et al.

(10) Patent No.: US 9,073,548 B2
(45) Date of Patent: Jul. 7, 2015

(54) VEHICLE-MOUNTED RADAR APPARATUS

(71) Applicants: DENSO CORPORATION, Kariya, Achi-pref (JP); Mazda Motor Corporation, Aki-gun, Hiroshima-pref. (JP)

(72) Inventors: Akiyoshi Mizutani, Nagoya (JP); Keiji Matsuoka, Nagoya (JP); Koji Shimizu, Ichinomiya (JP); Haruki Okazaki, Hiroshima (JP)

(73) Assignees: DENSO CORPORATION, Kariya (JP); Mazda Motor Corporation, Hiroshima (JP)

( * ) Notice: Subject to any disclaimer, the term of this patent is extended or adjusted under 35 U.S.C. 154(b) by 224 days.

(21) Appl. No.: 13/764,903

(22) Filed: Feb. 12, 2013

(65) Prior Publication Data

US 2013/0207834 A1 Aug. 15, 2013

(30) Foreign Application Priority Data

Feb. 13, 2012 (JP) ................................. 2012-028566

(51) Int. Cl.
*G01S 13/93* (2006.01)
*B60W 30/165* (2012.01)
(Continued)

(52) U.S. Cl.
CPC ............ *B60W 30/165* (2013.01); *B60W 30/16* (2013.01); *G01S 7/411* (2013.01); *G01S 13/345* (2013.01);
(Continued)

(58) Field of Classification Search
CPC ... B60W 30/14; B60W 30/16; B60W 30/165; G01S 7/02; G01S 7/41; G01S 7/411; G01S 13/02; G01S 13/06; G01S 13/08; G01S 13/32; G01S 13/34; G01S 13/345; G01S 13/88; G01S 13/93; G01S 13/931; G01S 2013/9325; G01S 2013/9346; G01S 2013/935; G01S 2013/9353

USPC .......... 342/27, 28, 70–72, 89–103, 104–115, 342/118, 128–133, 175, 192–197, 146, 147
See application file for complete search history.

(56) References Cited

U.S. PATENT DOCUMENTS 5,504,487 A * 4/1996 Tucker ............................ 342/90
5,561,431 A * 10/1996 Peele et al. ...................... 342/90
(Continued)

FOREIGN PATENT DOCUMENTS

CN 1657971 8/2005
JP 6-207979 A * 7/1994 ...................... 342/90
(Continued)

OTHER PUBLICATIONS

English abstract for Japanese patent publication JP6-207979A, published on Jul. 26, 1994.*

(Continued)

*Primary Examiner* — Bernarr Gregory
(74) *Attorney, Agent, or Firm* — Harness, Dickey & Pierce, PLC (57) ABSTRACT

A vehicle-mounted radar apparatus for transmitting radar waves toward the outside of a vehicle mounting the apparatus thereon and receiving the radar waves reflected from an object to thereby acquire information about the object. In the apparatus, a target detection unit transmits and receives the radar waves to detect positions of targets. An object position determination unit determines a position of the object reflecting the radar waves on the basis of the positions of the targets. A representative target selection unit selects a representative target from the targets. A same-object target selection unit selects targets belonging to the same object as the representative target. A large-vehicle determination unit determines whether or not the object is a large vehicle on the basis of a number of targets selected by the same-object target selection unit and reflection wave received powers for the respective targets.

13 Claims, 7 Drawing Sheets

(51) Int. Cl.
  *G01S 7/41* (2006.01)
  *G01S 13/00* (2006.01)
  *B60W 30/16* (2012.01)
  *G01S 13/34* (2006.01)

(52) U.S. Cl.
  CPC ....... *G01S 13/931* (2013.01); *G01S 2013/9325* (2013.01); *G01S 2013/9346* (2013.01); *G01S 2013/935* (2013.01); *G01S 2013/9353* (2013.01)

(56) References Cited

U.S. PATENT DOCUMENTS

| | | | |
|---|---|---|---|
| 5,563,601 A * | 10/1996 | Cataldo | 342/28 |
| 5,710,565 A | 1/1998 | Shirai et al. | |
| 5,867,118 A * | 2/1999 | McCoy et al. | 342/90 |
| 6,573,861 B1 * | 6/2003 | Hommel et al. | 342/192 |
| 6,741,204 B2 * | 5/2004 | Kumon et al. | 342/70 |
| 6,937,185 B1 * | 8/2005 | Collazo et al. | 342/195 |
| 7,920,087 B2 * | 4/2011 | Ogawa | 342/70 |
| 2003/0142007 A1 | 7/2003 | Ono et al. | |

FOREIGN PATENT DOCUMENTS

| | | |
|---|---|---|
| JP | 08-279099 | 10/1996 |
| JP | 11-271441 | 10/1999 |
| JP | 2002/341021 | 11/2002 |

OTHER PUBLICATIONS

Office Action dated Jun. 5, 2014 in corresponding Chinese Application No. 201310050986.9.
Office Action dated Mar. 10, 2015 in corresponding Japanese Application No. 2012-028566.

* cited by examiner

VEHICLE-MOUNTED RADAR APPARATUS

CROSS-REFERENCE TO RELATED APPLICATION

This application is based on and claims the benefit of priority from earlier Japanese Patent Application No. 2012-28566 filed Feb. 13, 2012, the description of which is incorporated herein by reference.

BACKGROUND

1. Technical Field

The present invention relates to a radar apparatus for transmitting and receiving radar waves to thereby detect an object reflecting the radar waves.

2. Related Art

A known vehicle-mounted radar apparatus transmits radar waves, such as laser waves or millimeter waves, with a predetermined scan angle every predetermined time interval and receives the radar waves reflected from an object around the vehicle mounting the radar apparatus thereon (hereinafter referred to as the own vehicle), thereby detecting the object around the own vehicle.

Such a vehicle-mounted radar apparatus is used in an automatic cruise control (ACC) system or the like adapted to detect a vehicle traveling ahead of the own vehicle in the same lane as the own vehicle (referred to as a preceding vehicle), and control a vehicle speed of the own vehicle so that a distance between the own vehicle and the preceding vehicle is maintained or kept constant.

To prevent a vehicle traveling in a lane other than the own lane (the lane in which the own vehicle is traveling) from being detected incorrectly as a preceding vehicle during cornering of the own vehicle, the ACC system mounted on the own vehicle, as disclosed in Japanese Patent Application Laid-Open Publication No. H08-27909, calculates a probability that a vehicle ahead of the own vehicle is traveling in the own lane on the basis of a curve radius of the own lane and a position of the vehicle traveling ahead of the own vehicle relative to the own vehicle, and on the basis of the calculated probability, determines whether or not the vehicle ahead of the own vehicle is a preceding vehicle traveling in the own lane. In the ACC system, when it is determined that the vehicle ahead of the own vehicle is a preceding vehicle, a distance between the preceding vehicle and the own vehicle is controlled to be maintained or kept constant.

Figure 6A:
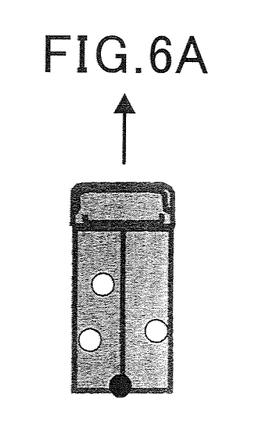
FIG. 6A shows an example of reflection points of a preceding vehicle during traveling completely straight.

The preceding vehicle may include not only reflection points on the rear portion of the preceding vehicle, but also reflection points in the interior of the preceding vehicle, as shown in FIG. 6A (where, for simplicity, only one reflection point on the rear portion is depicted and each of the other reflection points is in the interior or on a side portion of the preceding vehicle). The term "reflection point" refers to a point or spot from which radar waves are reflected. Mostly, a position of the preceding vehicle relative to the own vehicle is determined by using the reflection point(s) on the rear portion of the preceding vehicle.

Figure 6B:
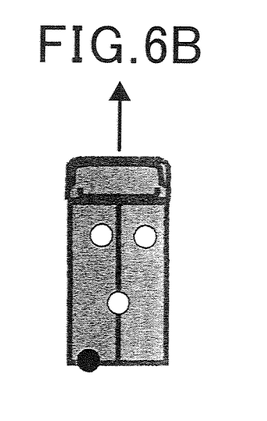
FIG. 6B shows an example of reflection points of the preceding vehicle during traveling substantially straight.
Figure 6C:
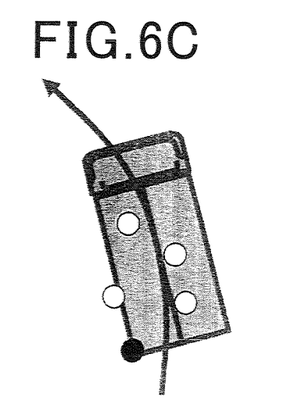
FIG. 6C shows an example of reflection points of the preceding vehicle during cornering.

As shown in FIG. 6B, however, a lateral position (a position along a width of the own vehicle) of the reflection point on the rear portion of the preceding vehicle may be off-centered even when the preceding vehicle is traveling straight. This is because, since the preceding vehicle is unable to travel completely straight, an aspect angle between the preceding vehicle and the own vehicle varies with time, or pitching of the own vehicle causes a back-and-forth rocking motion, the position of the reflection point on the rear portion of the preceding vehicle fluctuates due to the nature of millimeter waves. In addition, during cornering of the preceding vehicle as shown in FIG. 6C, the lateral position of the reflection point on the rear portion of the preceding vehicle may be displaced in a cornering direction from the lateral position before the cornering. That is, the lateral position of the reflection point on the rear portion of the preceding vehicle may be displaced to the left for a left-hand curve or to the right for a right-hand curve. This is because, when the preceding vehicle is traveling straight, radar waves reflected from the center or its vicinity of the rear portion of the preceding vehicle will be detected by the own vehicle, and when the preceding vehicle is cornering to the left/right, radar waves reflected from a left/right edge of the rear portion of the preceding vehicle will be detected by the own vehicle. As such, whether during traveling straight of the preceding vehicle or during cornering of the preceding vehicle, the detected position of the preceding vehicle may thus vary with time. Accordingly, the preceding vehicle traveling in the same lane as the own vehicle may be detected incorrectly as a vehicle traveling in a different lane.

Particularly, when the preceding vehicle is a large vehicle, such as a truck or the like, a vehicle width is greater than that of a mid-size car. Accordingly, the large vehicle has a distance between the center of the rear portion and the left/right edge of the rear portion greater than that of the mid-size car. This may lead to a greater reduction in accuracy of detecting the position of the preceding vehicle.

In consideration of the foregoing, it would therefore be desirable to have a vehicle-mounted radar apparatus capable of preventing reduction in accuracy of detecting a position of a preceding vehicle due to the preceding vehicle being a large vehicle.

SUMMARY

In accordance with an exemplary embodiment of the present invention, there is provided a vehicle-mounted radar apparatus for transmitting radar waves toward the outside of a vehicle mounting the apparatus thereon (hereinafter referred to as a radar-mounting vehicle) and receiving the radar waves reflected from an object to acquire information about the object.

In the apparatus, a target detection unit transmits and receives the radar waves to detect positions of targets reflecting the radar waves, and an object position determination unit determines a position of the object reflecting the radar waves on the basis of the positions of the targets detected by the target detection unit.

The term "target", here, refers to a radar-wave reflection point on or in the object. A plurality of radar-wave reflection points may be detected from one object.

Further, in the apparatus, a representative target selection unit selects one of the targets detected by the target detection unit that fulfills a predetermined representative-target designation condition for designating a representative of the targets detected by the target detection unit, and a same-object target selection unit selects, from the targets detected by the target detection unit, targets that fulfill a predetermined same-object target selection condition for determining which of the targets detected by the target detection unit belongs to the same object as the representative target.

The representative target and the targets selected by the same-object target selection unit other than the representative target forms together a same-object target group. The object that each target of the same-object target group belongs to is hereinafter referred to as a specific reflecting object.

The same-object target selection condition may state that the representative target is located closest to the own vehicle (radar-mounting vehicle).

Still further, in the apparatus, a large-vehicle determination unit determines whether or not the specific reflecting object is a large vehicle on the basis of at least one of a number of targets of the same-object target group and a power spectrum indicative of reflection wave received powers for the respective targets of the same-object target group.

Preferably, the large-vehicle determination unit determines whether or not the number of targets of the same-object target group is equal to or greater than a predetermined threshold target number for large-vehicle determination, and when it is determined that the number of targets of the same-object target group is equal to or greater than the predetermined threshold target number for large-vehicle determination, determines the specific reflecting object is a large vehicle.

Since the number of targets of the same-object target group in the case of the specific reflecting object being a large vehicle, such as a truck, is greater than the number of targets of the same-object target group in the case of the specific reflecting object being a non-large vehicle, such as a mid-size car, the preceding vehicle for which the number of targets of the same-object target group is equal to or greater than the predetermined threshold pair number for large vehicle determination can be identified as a large vehicle. The predetermined threshold target number for large-vehicle determination needs to be previously determined by experiment.

The radar apparatus as configured as above is allowed to determine the position of the specific reflecting object after determining that the specific reflecting object is a large vehicle.

Preferably, the object position determination unit sets a position of a target inclusion region so that all the targets of the same-object target group are included in the target inclusion region, thereby determining the position of the specific reflecting object.

Yet still further, in the apparatus, a target inclusion region changing unit, when it is determined by the large-vehicle determination unit that the specific reflecting object is a large vehicle, enlarges the target inclusion region.

This can prevent reduction in accuracy of detecting the preceding vehicle position due to the preceding vehicle being a large vehicle. For example, even with larger variations in preceding vehicle position when the preceding vehicle is a large vehicle than when the preceding vehicle is a non-large vehicle, such as a mid-size car, the preceding vehicle position can more accurately be determined.

Preferably, the target inclusion region changing unit, in response to whether or not it is determined by the large-vehicle determination unit that the specific reflecting object is a large vehicle, changes the target inclusion region between a target inclusion region for large vehicles and a target inclusion region for non-large vehicles, the target inclusion region for large vehicles is larger than the target inclusion region for non-large vehicles. More preferably, the target inclusion region changing unit, when it is determined by the large-vehicle determination unit that the specific reflecting object is a large vehicle, changes the target inclusion region to the target inclusion region for large vehicles.

With this configuration, the object position determination unit, when it is determined by the large-vehicle determination unit that the specific reflecting object is a large vehicle, sets a position of the target inclusion region for large vehicles so that all the targets of the same-object target group are included in the target inclusion region for large vehicles, thereby accurately determining a position of the specific reflecting object.

This, when the preceding vehicle is a large vehicle, can prevent occurrence of a situation such that two or more vehicles smaller than a large vehicle, for example, two or more mid-size cars, are incorrectly detected ahead of the own vehicle.

Alternatively, the large-vehicle determination unit determines whether or not a reflection wave received power for one of the targets of the same-object target group that fulfills a predetermined target selection condition for selecting a target used by the large-vehicle determination unit to determine whether or not the specific reflecting object is a large vehicle is equal to or greater than a predetermined threshold received power for large-vehicle determination, and when it is determined that the reflection wave received power for the target that fulfills the predetermined target selection condition is equal to or greater than the predetermined threshold received power for large-vehicle determination, determines that the specific reflecting object is a large vehicle.

The reflection wave received power for a large vehicle, such as a truck, is greater than the reflection wave received power for a non-large vehicle, such as a mid-size car. Hence, the preceding vehicle can be identified as a large vehicle when its reflection wave received power is equal to or greater than the predetermined threshold received power for large-vehicle determination. The predetermined threshold received power for large-vehicle determination needs to be previously determined by experiment.

Preferably, the predetermined same-object target selection condition includes at least one of: a first condition that a difference in longitudinal position between the representative target and a target belonging to the specific reflecting object is less than a predetermined threshold value of longitudinal position difference; a second condition that a difference in lateral position between the representative target and a target belonging to the specific reflecting object is less than a predetermined threshold value of lateral position difference; a third condition that a difference in relative speed between the representative target and a target belonging to the specific reflecting object is less than a predetermined threshold value of relative speed difference; and a fourth condition that a difference in reflection wave received power between the representative target and a target belonging to the specific reflecting object is less than a predetermined threshold value of reflection wave received power difference.

DESCRIPTION OF SPECIFIC EMBODIMENTS

The present inventions will be described more fully hereinafter with reference to the accompanying drawings. Like numbers refer to like elements throughout.

Figure 1:
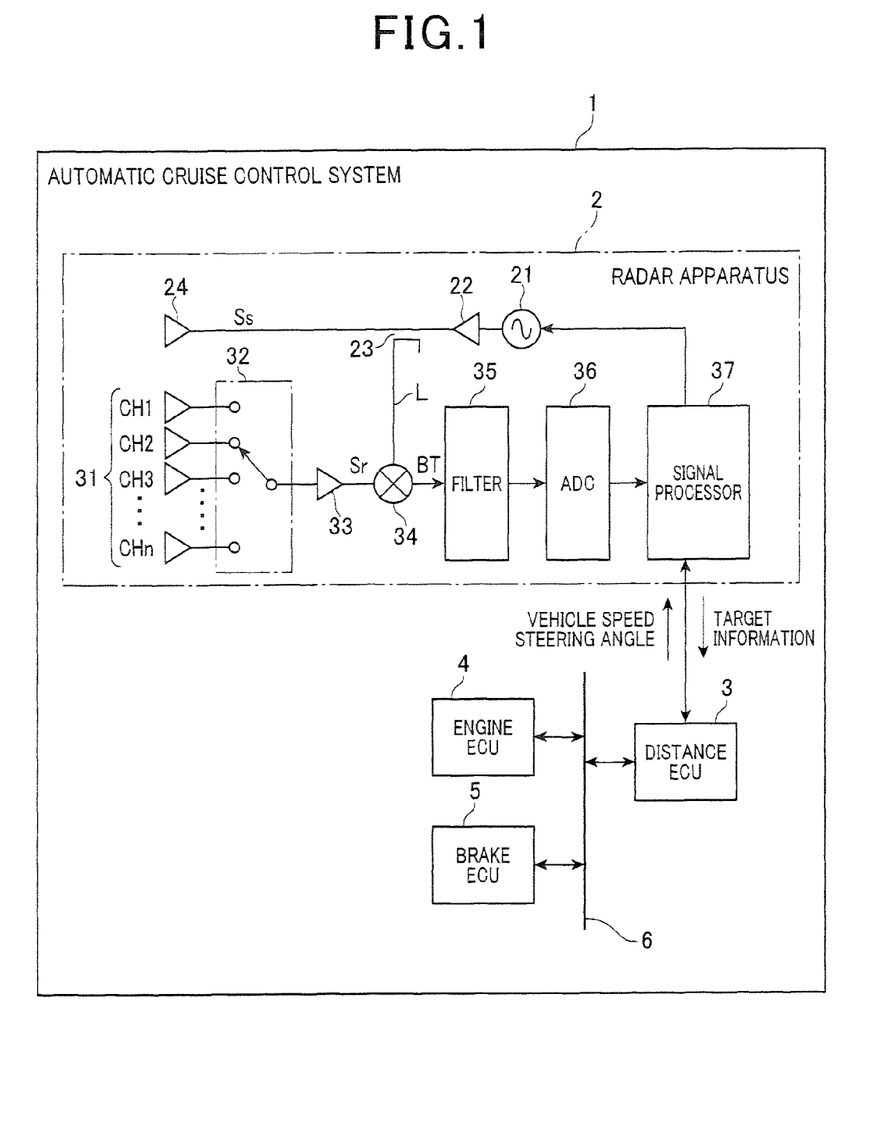
FIG. 1 shows a schematic block diagram of an automatic cruise control system including a radar apparatus in accordance with one embodiment of the present invention.

FIG. 1 shows a schematic block diagram of an automatic cruise control system 1 in accordance with one embodiment of the present invention. The automatic cruise control system 1 is mounted on a vehicle and includes, as shown in FIG. 1, a radar apparatus 2, a distance electronic control unit (distance ECU) 3, an engine electronic control unit (engine ECU) 4, a brake electronic control unit (brake ECU) 5. The ECUs 3, 4, 5 are connected to each other via an in-vehicle local area network 6 and thereby allowed to output and receive data.

The radar apparatus 2 in the form of a so-called millimeter wave radar of FMCW type detects an object, such as a preceding vehicle or a roadside object, by transmitting and receiving millimeter radar waves, generates target information about a preceding vehicle traveling ahead of the own vehicle on the basis of the detections, and sends the target information to the distance ECU 3. The target information includes at least a speed and a position (distance and/or direction) of the preceding vehicle relative to the own vehicle.

The brake ECU 5 determines a brake pedal state on the basis of not only detection information (a steering angle and/or a yaw rate) received from a steering sensor (not shown) and/or a yaw rate sensor (not shown), but also detection information received from a master cylinder (MC) pressure sensor, and sends the determined brake pedal state to the distance ECU 3. Further, the brake ECU 5 receives information including a target acceleration and a braking request from the distance ECU 3, and in response to the received information and the determined brake pedal state, drives a brake actuator that opens and closes a pressure increasing control valve and a pressure reducing control valve involved in a brake hydraulic circuit to thereby control a braking force.

The engine ECU 4 sends to the distance ECU 3 detection information including a vehicle speed, a controlled state of the engine, and an operated state of the accelerator received from a vehicle speed sensor (not shown), a throttle position sensor (not shown), an accelerator pedal position sensor (not shown), respectively. The engine ECU 4 receives from the distance ECU 3 information including a target acceleration and a fuel-cut request, and outputs an actuation command to a throttle actuator that adjusts a throttle position of the internal-combustion engine in response to an operating condition specified from the received information.

The distance ECU 3 receives a vehicle speed and a controlled state of the engine and the like from the engine ECU 4 and receives a steering angle, a yaw rate, a controlled state of the brake and the like from the brake ECU 5. In addition, on the basis of setting values set via an cruise control switch (not shown) and a target distance setting switch (not shown) and the like, as well as the target information received from the radar apparatus 2, the distance ECU 3 sends a target acceleration and a fuel-cut request and the like to the engine ECU 4 and sends the target acceleration and a braking request and the like to the brake ECU 5, as control commands for maintaining a suitable distance between the own vehicle and the preceding vehicle.

The radar apparatus 2 will now be explained in detail.

The radar apparatus 2 includes an oscillator 21 that generates a radio-frequency (RF) signal in a millimeter waveband modulated in frequency by a modulation signal with each cycle having an ascent interval in which the frequency of modulation signal is linearly increasing with time and a descent interval in which the frequency of modulation signal is linearly decreasing with time, an amplifier 22 that amplifies the radio-frequency signal generated in the oscillator 21, a power distributor 23 that splits an output of the amplifier 22 into a transmit signal Ss and a local signal L, a transmit antenna 24 that emits a radar wave in response to the transmit signal Ss, and multiple receive antennas 31 including n (where n is a positive integer) receive antennas for receiving the radar wave (for example, in the form of an array antenna).

The radar apparatus 2 further includes a receive switch 32 that sequentially selects the multiple receive antennas 31 and forwards a received signal Sr from selected one of the receive antennas for further processing, an amplifier 33 that amplifies a received signal Sr from the receive switch 32, a mixer 34 that mixes the received signal Sr amplified by the amplifier 33 with the local signal L to generate a beat signal BT, a filter 35 that removes unnecessary signal components from the beat signal BT generated in the mixer 34, an analog-to-digital converter (ADC) 36 that samples an output of the filter 35 to convert the beat signal BT into digital data, and a signal processor 37 that controls the operation of the oscillator 21 (e.g., activation and deactivation) and the sampling of the beat signal BT via the ADC 36, performs the signal analysis by using the sampled data, and communicates with the distance ECU 3 to receive information necessary for the signal analysis (including a vehicle speed and the like) and transmit information resulting from the signal analysis (including the target information and the like).

The multiple receive antennas 31 are configured such that a beam width of each antenna is greater than the beam width of the transmit antenna 24. The multiple receive antennas 31 are respectively associated with the channels CH1 to CHn.

The signal processor 37 is built around a well-known microcomputer. The signal processor 37 further includes a processor which performs a fast Fourier transform (FFT) on data acquired via the ADC 36, such as a digital signal processor (DSP).

In the radar apparatus 2 configured as above, once the oscillator 21 is activated in response to an instruction from the signal processor 37, the oscillator 21 generates a radio-frequency signal, which is in turn amplified by the amplifier 22. Subsequently, the radio-frequency signal is split into a transmit signal Ss and a local signal L. The transmit signal Ss is transmitted as a radar wave via the transmit antenna 24.

A reflected wave from an object is received by each of the multiple receive antennas 31. Only a received signal Sr of one of the receive channels CHi (i=1 to n) selected by the receive switch 32 is amplified by the amplifier 33 and then fed to the mixer 34. The mixer 34 mixes the received signal Sr with the local signal L to generate a beat signal BT. After unnecessary signal components are removed from the beat signal BT by the filter 35, the beat signal BT is sampled by the ADC 36. The sampled data is then fed to the signal processor 37.

The receive switch 32 sequentially and cyclically selects all the receive channels CH1 to CHn at a predetermined switching frequency. For example, each of the receive channels CH1 to CHn is selected 512 times for each modulation cycle of the radar wave. The ADC 36 samples the received signal Sr in synchrony with the switching timings of the receive switch 32. That is, for each of the receive channels CH1 to CHn, the sampled data will be accumulated for each of the ascent and descent intervals of each modulation cycle of the radar wave.

The signal processor 37 of the radar apparatus 2 performs the signal analysis after the passage of every modulation cycle of the radar wave, where, for each of the receive channels CH1 to CHn, the signal processor 37 subjects the accumulated data for each of ascent and descent intervals to FFT processing, and then performs a target information generation process, where the signal processor 37 detects a preceding object and generates target information about the preceding vehicle by using information resulting from the signal analysis. Since the signal analysis is a well-known technique, it will not be explained here in detail.

Figure 2A:
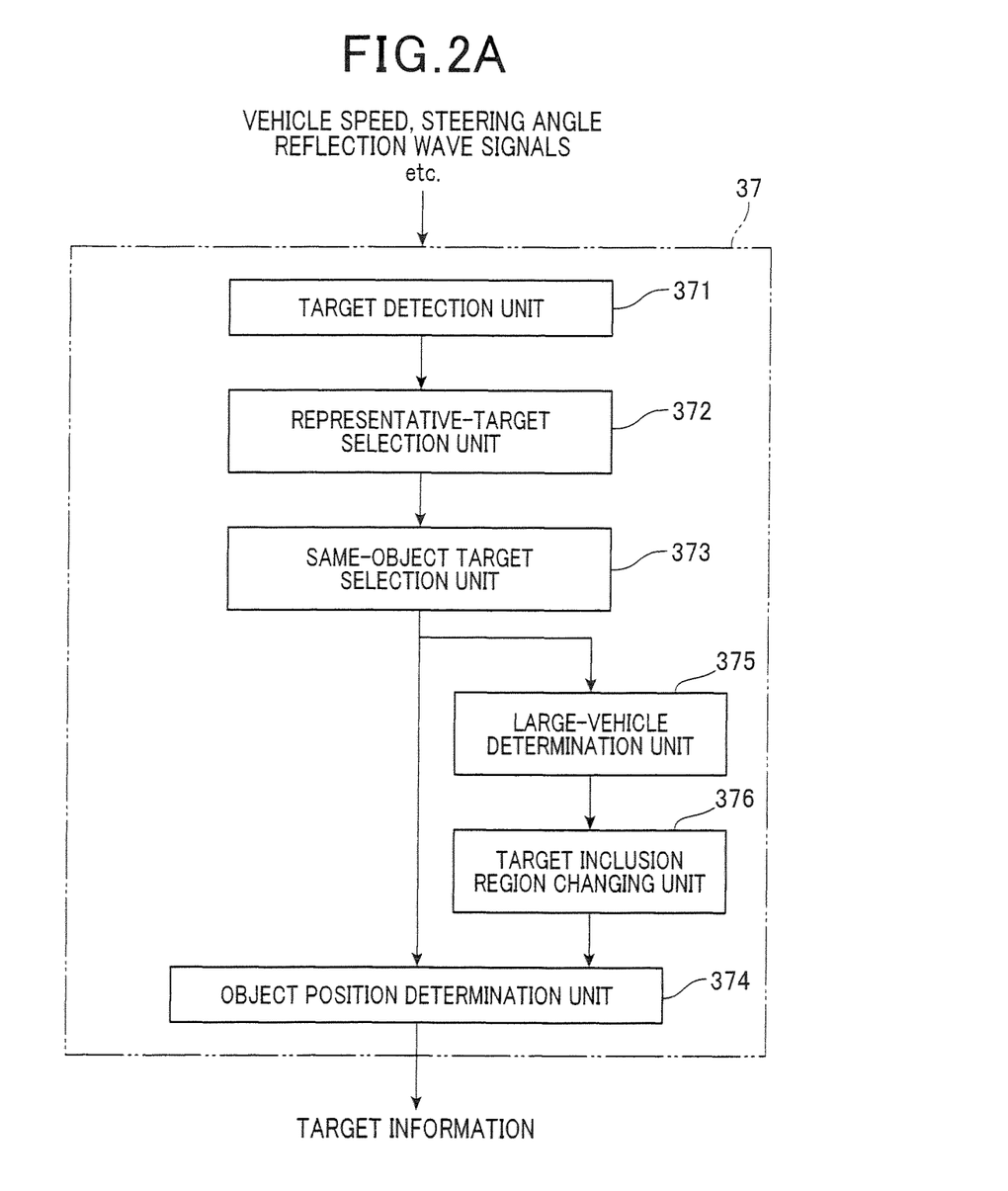
FIG. 2A shows a schematic block diagram of a signal processor of the radar apparatus.

As shown in FIG. 2A, the signal processor 37 of the radar apparatus 2 includes a target detection unit 371, a representative-target selection unit 372, a same-object target selection unit 373, an object position determination unit 374, a large-vehicle determination unit 375, and a target inclusion region changing unit 376. The operations of these components will be explained later.

Figure 2B:
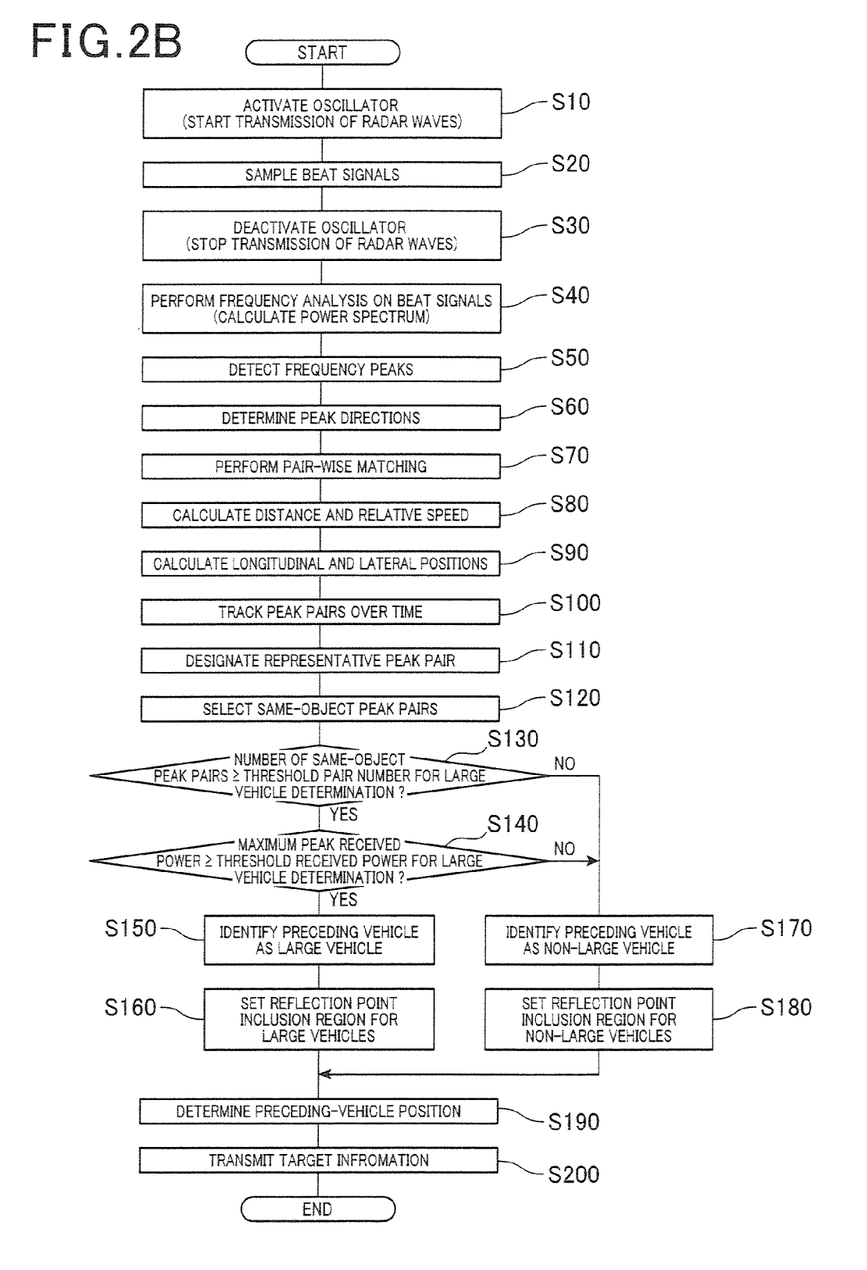
FIG. 2B shows a flowchart of a target information generation process performed in the signal processor.

The target information generation process performed in the signal processor 37 will now be explained with reference to FIG. 2B. FIG. 2B shows a flowchart of the target information generation process. The target information generation process is performed repeatedly every time the fast Fourier transformation (FFT) processing on sampled data for one modulation cycle is completed.

First, in step S10, the signal processor 37 activates the oscillator 21 to start transmission of radar waves. Subsequently, in step S20, the signal processor 37 samples the beat signals BT outputted from the ADC 36 during one modulation cycle having an ascent interval in which the modulation signal frequency gradually increases with time and a descent interval in which the modulation signal frequency gradually decreases with time. In step S30, the signal processor 37 deactivates the oscillator 21 to stop the transmission of radar waves.

Subsequently, in step S40, the signal processor 37 subjects the sampled data acquired in step S20 to the frequency analysis (e.g., FFT processing in the present embodiment) to determine, for each of the receive channels CH1 to CHn, a power spectrum of the beat signal BT for each of the ascent and descent intervals. The power spectrum plots an intensity (power spectrum intensity) for each of frequency constituents of the beat signal BT.

Figure 3A:
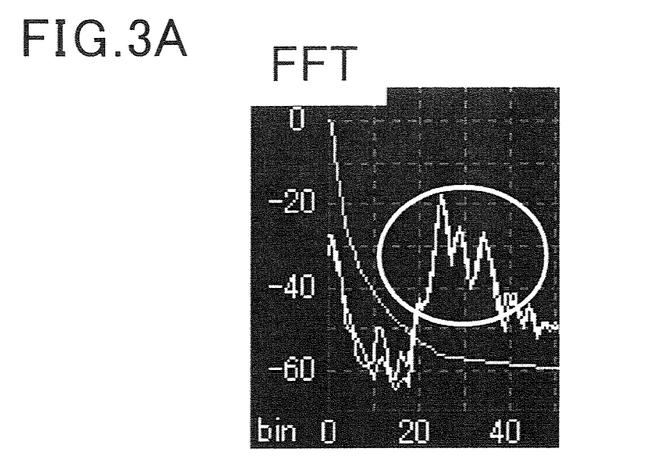
FIG. 3A shows an example of a power spectrum of a beat signal for a truck, which exhibits a plurality of frequency peaks.

In step S50, for each of the receive channels CH1 to CHn, the signal processor 37 detects frequency peaks fbu-1 to fbu-m (m: a positive integer) present in the power spectrum for the ascent interval and frequency peaks fbd-1 to fbd-m present in the power spectrum for the descent interval. Each of the detected frequency peaks fbu, fbd corresponds to a candidate for target (hereinafter referred to as a target candidate). The term "target" here refers to a reflection point of the object, from which point radar waves are reflected. A plurality of target candidates may be detected from one object. FIG. 3A shows an example of a power spectrum of a beat signal BT reflected from a truck, where the power spectrum has three frequency peaks.

More specifically, in step S50, the signal processor 37 calculates an arithmetic mean of the power spectra for the respective receive channels CH1 to CHn to determine a mean spectrum. The signal processor 37 detects all frequencies at which the mean spectrum exhibits a peak intensity above a predetermined threshold (referred to as frequency peaks), thereby detecting the frequency peaks fbu-1 to fbu-m for the ascent interval and the frequency peaks fbd-1 to fbd-m for the descent interval.

Further, in step S60, the signal processor 37 detects, for each of the detected frequency peaks fbu, fbd, a direction of the target candidate corresponding to the frequency peak relative to the own vehicle (hereinafter referred to as a peak direction) on the basis of phase differences among beat signal components of the same peak frequency acquired via the respective receive channels CH1 to CHn by using the digital beam forming technique or the like.

Thereafter, in step S70, the signal processor 37 performs pair-wise matching on all the detected frequency peaks fbu, fbd to detect all pairs of frequency peaks fbu, fbd such that the frequency peaks fbu, fbd in each pair correspond to the same target candidate. More specifically, in the pair-wise matching, it is determined whether or not a difference in peak intensity and a difference in peak angle for each pair of detected frequency peaks fbu and fbd are both within respective predetermined acceptable range. Each pair of detected frequency peaks fbu, fbd, whose peak intensity difference and peak angle difference are both within the respective predetermined acceptable range, is registered as a peak pair.

In step S80, for each registered peak pair, the signal processor 37 calculates a distance between the radar apparatus 2 of the own vehicle and the target candidate corresponding to the registered peak pair and a speed of the target candidate corresponding to the registered peak pair relative to the own vehicle (also referred to as a relative speed) by using a well-known technique available in the FMCW-based radar apparatus 2.

In step S90, for each registered peak pair, the signal processor 37 calculates longitudinal and lateral positions of the target candidate corresponding to the registered peak pair on the basis of the peak direction of the target candidate relative to the own vehicle calculated in step S60 and the distance of the target candidate relative to the own vehicle calculated in step S80. The longitudinal position of the target candidate is a position of the target candidate relative to the own vehicle along the travelling direction of the own vehicle. The lateral position of the target candidate is a position of the target candidate relative to the own vehicle along the vehicle width direction of the own vehicle. The longitudinal and lateral positions and the relative speed of the target candidate are determined in this way for each registered peak pair.

Subsequently, in step S100, for each peak pair registered in the current measurement cycle (hereinafter referred to as a current cycle pair), the signal processor 37 tracks the peak-pair to check for traceability, where it is determined whether or not a target candidate corresponding to the current cycle pair is identified as one of target candidates corresponding to the respective peak pairs registered in the previous measurement cycle (hereinafter each referred to as a previous cycle pair).

More specifically, for each previous cycle pair, the signal processor 37, on the basis of information about the previous cycle pair including longitudinal and lateral positions, a relative speed, and a peak direction of the previous cycle pair calculated in the previous measurement cycle, predicts longitudinal and lateral positions and a relative speed of the previous cycle pair in the current measurement cycle. The signal processor 37 then determines whether or not there exists a current cycle pair such that a difference between the predicted longitudinal position of the previous cycle pair and a detected longitudinal position of the current cycle pair is less than a predetermined upper limit longitudinal position difference, a difference between the predicted lateral position of the previous cycle pair and a detected lateral position of the current cycle pair is less than a predetermined upper limit lateral position difference, and a difference between the predicted relative speed of the previous cycle pair and a detected relative speed of the current cycle pair is less than a predetermined upper limit relative speed difference. If it is determined that the longitudinal position difference, the lateral position difference, and the relative speed difference are less than the upper limit longitudinal position difference, the upper limit lateral position difference, and the upper limit relative speed difference, respectively, then it is determined that the current cycle pair is traceable back to the previous cycle pair. When it has already been determined in a similar manner that the previous cycle pair is traceable back to a cycle pair registered in one preceding cycle, the current cycle pair is traceable back to the cycle pair registered in two preceding cycle through the previous cycle pair. In general, it can be determined whether or not the current cycle pair is traceable back to a registered peak pair in N (where N is a positive integer) preceding cycle through N−1 intermediate cycle pairs. In the present embodiment, when a registered peak pair in one measurement cycle is traceable back to a registered pair in five or more preceding cycle through four or more intermediate registered pairs is identified as a target.

Subsequently, in step S110, on the basis of the longitudinal and lateral positions calculated in step S90, the signal processor 37 designates, among peak pairs identified as a target in step S100, a peak pair that fulfills a predetermined representative-pair designation condition as a representative peak pair. In the present embodiment, the representative-pair designation condition states that the representative peak pair is a peak pair whose corresponding target is located closest to the own vehicle.

In S120, the signal processor 37 selects, from the peak pairs registered in step S70, peak pairs belonging to (or arising from) the same object as the representative peak pair designated in step S110, which fulfill a predetermined same-object target selection condition. A peak pair that fulfills the same-object target selection condition is referred to as a same-object peak pair. The representative peak pair itself is assumed to satisfy the same-object target selection condition and is also called a same-object peak pair. The representative peak pair and the selected peak pairs other than the representative peak pair form together a same-object peak pair group. The object that each peak pair of the same-object peak pair group belongs to is here referred to as a specific reflecting object.

Figure 3B:
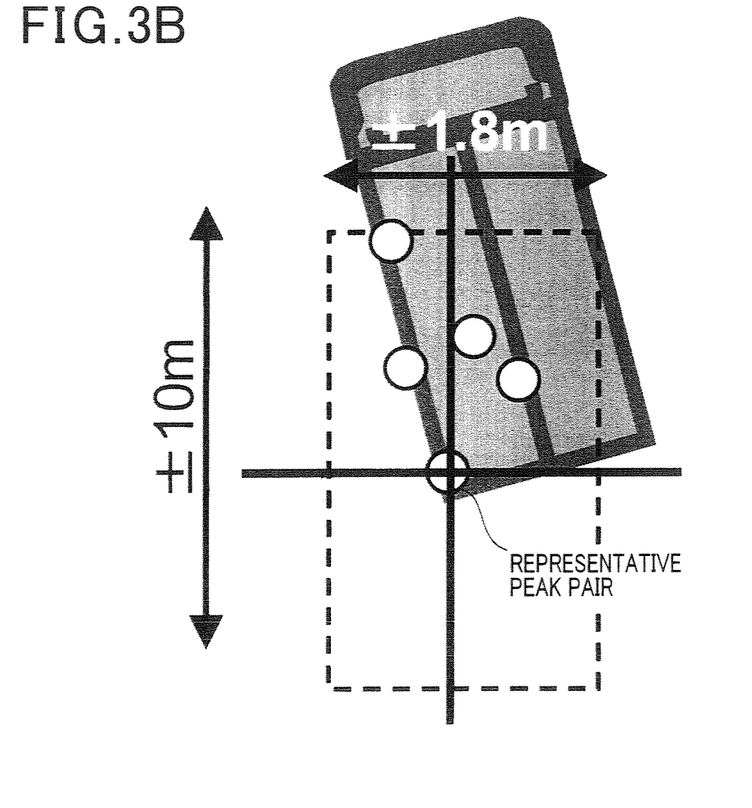
FIG. 3B shows an example of a same-object target selection condition.

In the present embodiment, the same-object target selection condition states that a peak pair belonging to the same object as the representative peak pair is a peak pair having a difference in longitudinal position between the peak pair and the representative peak pair less than a predetermined threshold value of longitudinal position difference, a difference in lateral position between the peak pair and the representative peak pair less than a predetermined threshold value of lateral position difference, and a difference in relative speed between the peak pair and the representative peak pair less than a predetermined threshold value of relative speed difference. In the present embodiment, as shown in FIG. 3B, the threshold value of longitudinal position difference is set at 10 m, the threshold value of lateral position difference is set at 1.8 m, and the threshold value of relative speed difference is set at 5 km/h. The threshold value of longitudinal position difference, the threshold value of lateral position difference, and the threshold value of relative speed difference are not limited to these values.

In step S130, the signal processor 37 determines whether or not the number of peak pairs selected in step S120 (including the representative peak pair) is equal to or greater than a predetermined threshold pair number for large vehicle determination. In the present embodiment, the threshold pair number for large vehicle determination is exemplarily set at six. If it is determined in step S130 that the number of same-object peak pairs is equal to or greater than the predetermined threshold pair number for large vehicle determination, then the process proceeds to step S140, where the signal processor 37 selects, from the same-object peak pairs selected in step S120, a same-object peak pair having a maximum frequency-peak intensity and determines whether or not a reflection wave received power for the selected same-object peak pair (hereinafter referred to as a maximum peak received power) is equal to or greater than a predetermined threshold received power for large vehicle determination. In the present embodiment, the predetermined threshold received power for large vehicle determination is exemplarily set at 30 dBsm.

If it is determined in step S140 that the maximum peak received power is equal to or greater than the predetermined threshold received power for large vehicle determination, then the specific reflecting object is identified as a large vehicle traveling ahead of the own vehicle in step S150. In step S160, a reflection point inclusion region used to determine a position of the specific reflecting object is changed to (or set to) a predetermined reflection point inclusion region for large vehicles. The process then proceeds to step S190.

In the present embodiment, there are two types of predetermined reflection point inclusion regions different in size from each other, each having a predetermined length (L) along the traveling direction of the own vehicle and a predetermined width (W) along the vehicle-width direction of the own vehicle. One is for large vehicles, and the other is for non-large vehicles. The reflection point inclusion region for large vehicles is a rectangle of 10 m (L) by 3.6 m (W), and the reflection point inclusion region for non-large vehicles is a rectangle of 5 m (L) by 1.8 m (W).

If it is determined in step S130 that the number of same-object peak pairs is less than the threshold pair number for large vehicle determination, or if it is determined in step S140 that the maximum peak received power is less than the predetermined threshold received power for large vehicle determination, then in step S170, the specific reflecting object is identified as a non-large vehicle (smaller than a large vehicle) traveling ahead of the own vehicle. In step S180, the reflection point inclusion region is changed to the predetermined reflection point inclusion region for non-large vehicles. The process then proceeds to step S190.

In step S190, the signal processor 37 determines a region in which the preceding vehicle is present (i.e., an occupied region) during the current measurement cycle on the basis of the positions of the peak pairs registered in step S70 and the reflection point inclusion region set in step S160 or S180. More specifically, the signal processor 37 sets a position of the reflection point inclusion region set in step S160 or S180 so that the peak pairs registered in step S70 are included therein. The reflection point inclusion region defined as above is regarded as the occupied region in which the preceding vehicle is present during the current measurement cycle. The position of the reflection point inclusion region is referred to as a preceding-vehicle position.

Subsequently, in step S200, the signal processor 37 generates target information including at least discrimination information determined in step S150 or step S170 indicative of whether the preceding vehicle is a large vehicle or a non-large vehicle, speed information indicative of a speed of the preceding vehicle relative to the own vehicle (relative speed), position information indicative of the preceding-vehicle position, and sends the target information to the distance ECU 3. The process of this cycle is then ended.

Referring again to FIG. 2A, the operations of the target detection unit 371, the representative-target selection unit 372, the same-object target selection unit 373, the object position determination unit 374, the large-vehicle determination unit 375, and the target inclusion region changing unit 376 will now be explained following the flow of the flowchart shown in FIG. 2B.

In the radar apparatus 2 configured as above, the target detection unit (as target detection means) 371 is responsible for the operation in step S90, where positions of targets reflecting radar waves emitted from the apparatus 2 (corresponding to respective peak pairs) are detected from the radar waves reflected from the targets.

The object position determination unit (as object position determination means) 374 is responsible for the operation in step S190, where a position of an object that the targets belong to (preceding-vehicle position) is determined on the basis of the detected positions of the targets and the reflection point inclusion region set in step S160 or S180.

The representative-target selection unit (as representative-target selection means) 372 is responsible for the operation in step S110, where a peak pair of the detected peak pairs (corresponding to the respective detected targets) that fulfills the representative-pair designation condition defined as above is designated as a representative peak pair.

The same-object target selection unit (as same-object target selection means) 373 is responsible for the operation in step S120, where peak pairs that fulfill the same-object target selection condition defined as above (same-object peak pairs) are selected from the detected peak pairs. Each peak pair that fulfills the same-object target selection condition is assumed to belong to the same object (specific reflecting object) as the representative peak pair.

The large-vehicle determination unit (as large-vehicle determination means) 375 is responsible for the operation in step S130, where it is determined whether or not the number of same-object peak pairs (including the representative peak pair) is equal to or greater than the predetermined threshold pair number for large vehicle determination.

In most cases, the number of same-object peak pairs for a large vehicle is no less than the number of same-object peak pairs for a non-large vehicle, such as a mid-size car. Therefore, the preceding vehicle for which the number of same-object peak pairs is equal to or greater than the predetermined threshold pair number for large vehicle determination is allowed to be identified as a large vehicle.

Figure 4A:
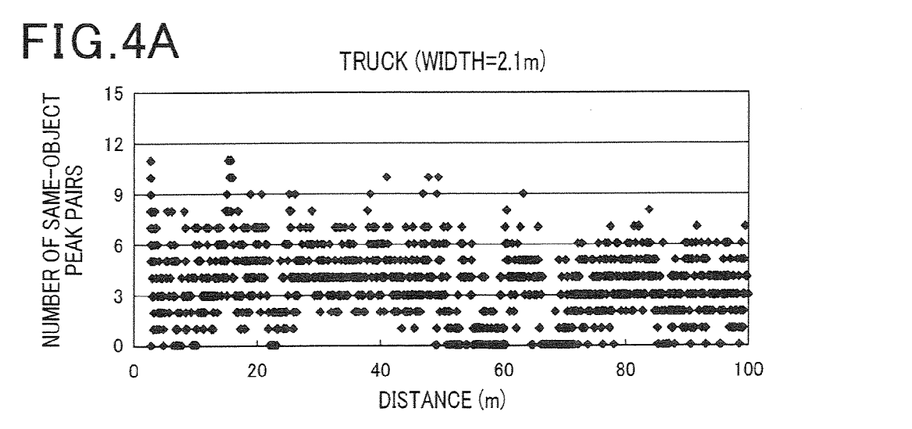
FIG. 4A shows a graph of the number of same-object peak pairs versus distance for a truck.
Figure 4B:
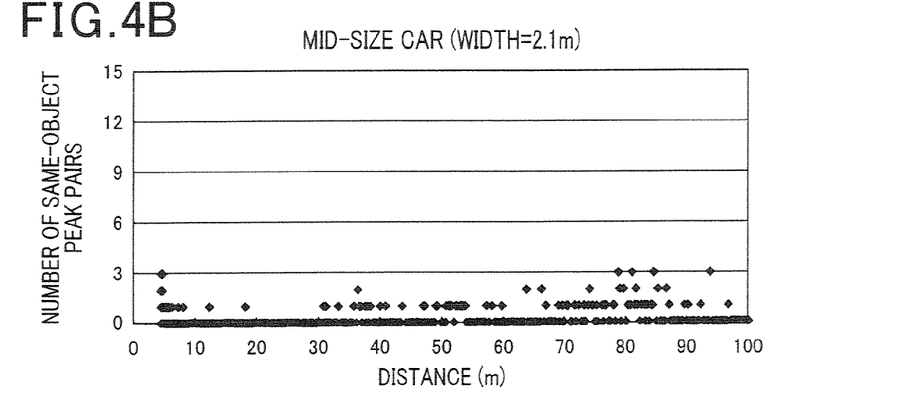
FIG. 4B shows a graph of the number of same-object peak pairs versus distance for a mid-size car.
Figure 4C:
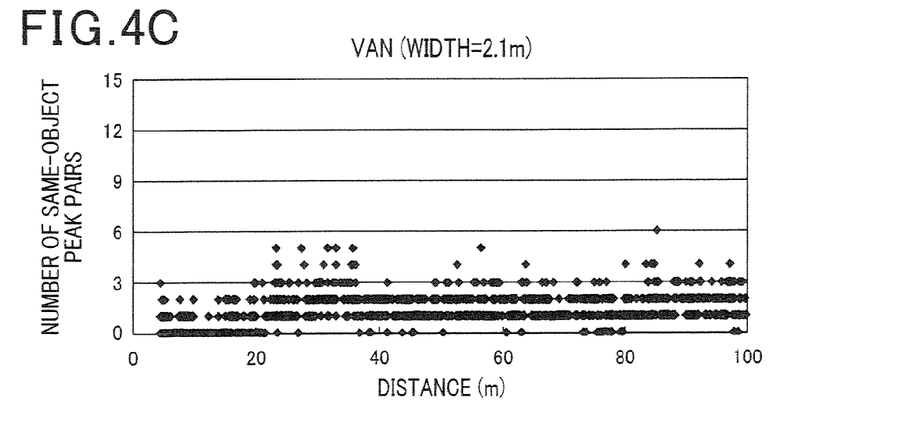
FIG. 4C shows a graph of the number of same-object peak pairs versus distance for a van.

FIG. 4A shows a graph of the number of peak pairs belonging to the same object versus distance from the own vehicle to the object for a truck having a width of 2.1 m, FIG. 4B shows a graph of the number of peak pairs belonging to the same object versus distance from the own vehicle to the object for a mid-size car having a width of 2.1 m, and FIG. 4C shows a graph of the number of peak pairs belonging to the same object versus distance from the own vehicle to the object for a van having a width of 2.1 m.

As shown in FIGS. 4A to 4C, the number of same-object peak pairs for a truck is usually greater than the number of same-object peak pairs for a mid-size car and the number of same-object peak pairs for a van. The number of same-object peak pairs for a truck is often equal to or greater than six, while the number of same-object peak pairs for a mid-size car is always equal to or less than three. The number of same-object peak pairs for a van is usually equal to or less than three, and hardly equal to or greater than six. This is why, in the present embodiment, the threshold pair number for large vehicle determination is set at six.

The large-vehicle determination unit 375 is further responsible for the operation in step S140, where it is determined whether or not a maximum peak received power for one of the same-object peak pairs selected in step S120 that has a maximum frequency-peak intensity is equal to or greater than the predetermined threshold received power for large vehicle determination.

Figure 5:
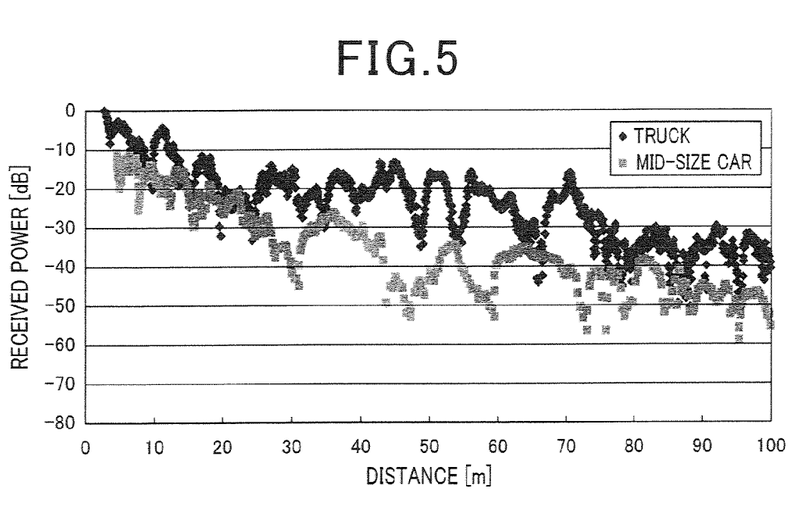
FIG. 5 shows a graph of beat signal received power versus distance for a truck and a mid-size car.

Since the maximum peak received power for a large vehicle is usually greater than the maximum peak received power for a non-large vehicle, such as a mid-size car, the preceding vehicle can be identified as a large vehicle when it is determined that its corresponding maximum peak received power is equal to or greater than the predetermined threshold received power for large vehicle determination. FIG. 5 shows a graph of beat signal received power versus inter-vehicle distance for a truck and a mid-size car. As can be seen in FIG. 5, the received power (maximum peak received power) for a truck is likely to be greater than the received power (maximum peak received power) for a mid-size car. The trucks have a tendency for having a greater received power than the mid-size cars. This is why, when the maximum peak received power is equal to or greater than the predetermined threshold received power for large vehicle determination, the preceding vehicle is allowed to be identified as a large vehicle.

The target inclusion region changing unit (as target inclusion region changing means) 376 is responsible for the operation in step S160, where if it is determined in step S130 that the number of same-object peak pairs (including the representative peak pair) is equal to or greater than the predetermined threshold pair number for large vehicle determination and it is further determined in step S140 that the maximum peak received power is equal to or greater than the predetermined threshold received power for large vehicle determination, then the reflection point inclusion region used to determine a position of the preceding vehicle (preceding vehicle position) is changed to the predetermined reflection point inclusion region for large vehicles.

The target inclusion region changing unit 376 is further responsible for the operation in step S180, where if it is determined in step S130 that the number of same-object peak pairs (including the representative peak pair) is less than the predetermined threshold pair number for large vehicle determination or if it is determined in step S140 that the maximum peak received power is less than the predetermined threshold received power for large vehicle determination, then the reflection point inclusion region is changed to the predetermined reflection point inclusion region for non-large vehicles.

A position of the preceding vehicle is determined in step S190 (performed in the object position determination unit 374) so that the peak pairs registered in step S70 are included in the reflection point inclusion region set in step S160 or step S180 in response to the determination whether or not the preceding vehicle is a large vehicle.

In the radar apparatus 2 configured as above, a position of an object from which the radar waves are reflected (preceding vehicle position) is determined after determining whether or not the preceding vehicle is a large vehicle. That is, a position of the preceding vehicle can be determined in response to the determination of whether or not the preceding vehicle is a large vehicle. This can prevent reduction in accuracy of detecting the preceding vehicle position due to the preceding vehicle being a large vehicle.

The position of the reflection point inclusion region suitably set in response to the determination of whether or not the preceding vehicle is a large vehicle is set in step S190 so that the reflection points (targets) belonging to the same preceding vehicle are included in the reflection point inclusion region. If it is determined that the preceding vehicle is a large vehicle, the reflection point inclusion region used to determine a position of the preceding vehicle is changed to (or set to) the reflection point inclusion region for large vehicles in step S160. The reflection point inclusion region for large vehicles is larger than the reflection point inclusion region for non-large vehicles. This, when the preceding vehicle is a large vehicle, can prevent occurrence of a situation such that two or more vehicles smaller than a large vehicle, for example, two or more mid-size cars, are incorrectly detected ahead of the own vehicle.

(Some Modifications)

There will now be explained some modifications of the above described embodiment that may be devised without departing from the spirit and scope of the present invention.

In the above described embodiment, if it is determined in step S130 that the number of same-object peak pairs (including the representative peak pair) is equal to or greater than the predetermined threshold pair number for large vehicle determination and if it is further determined in step S140 that the maximum peak received power is equal to or greater than the predetermined threshold received power for large vehicle determination, then the preceding vehicle is identified as a large vehicle in step S150. Alternatively, if it is determined that the number of same-object peak pairs (including the representative peak pair) is equal to or greater than the threshold pair number for large vehicle determination or if it is determined that the maximum peak received power is equal to or greater than the predetermined threshold received power for large vehicle determination, then the preceding vehicle may be identified as a large vehicle.

In the above described embodiment, the representative-pair designation condition states that the representative peak pair is a peak pair whose corresponding target is located closest to the own vehicle. Alternatively, the representative-pair designation condition may state that the representative peak pair is a peak pair having a maximum frequency-peak intensity.

In the above described embodiment, the same-object target selection condition states that a peak pair belonging to (or arising from) the same object as the representative peak pair is a peak pair having a difference in longitudinal position between the peak pair and the representative peak pair less than the predetermined threshold value of longitudinal position difference and a difference in lateral position between the peak pair and the representative peak pair less than the predetermined threshold value of lateral position difference, and a difference in relative speed between the peak pair and the representative peak pair less than the predetermined threshold value of relative speed difference. Alternatively, the same-object target selection condition may state that the representative peak pair is a peak pair belonging to (or arising from) the same object is a peak pair having similar properties, such as a received power and a distance from the own vehicle and the like, to those of the representative peak pair.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A vehicle-mounted radar apparatus for transmitting radar waves outward from a vehicle on which the vehicle-mounted radar apparatus is mounted, the vehicle being hereinafter referred to as a radar-mounting vehicle, and receiving the radar waves reflected from an object to acquire information about the object, the vehicle-mounted radar apparatus comprising:
    a target detection unit that transmits and receives the radar waves to detect positions of targets that are reflection points of an object reflecting the radar waves;
    a representative target selection unit that selects one of the targets detected by the target detection unit that fulfills a predetermined representative-target designation condition for designating a representative of the targets detected by the target detection unit;
    a same-object target selection unit that selects, from the targets detected by the target detection unit, targets that fulfill a predetermined same-object target selection condition for determining which of the targets detected by the target detection unit belongs to the same object as the representative target, the representative target and the targets selected by the same-object target selection unit other than the representative target forming together a same-object target group, and the object that each target of the same-object target group belongs to being referred to as a specific reflecting object;
    an object position determination unit that sets a target inclusion region so that all the targets of the same-object target group are included in the target inclusion region, thereby determining a position of the specific reflecting object; and
    a large-vehicle determination unit that determines whether or not the specific reflecting object is a large vehicle, a width of which is greater than 1.8 m, on the basis of at least one of a number of targets of the same-object target group and a power spectrum indicative of reflection wave received powers for the respective targets of the same-object target group.

2. The apparatus of claim 1, further comprising a target inclusion region changing unit that, when it is determined by the large-vehicle determination unit that the specific reflecting object is the large vehicle, enlarges the target inclusion region.

3. The apparatus of claim 2, wherein the target inclusion region changing unit, in response to whether or not it is determined by the large-vehicle determination unit that the specific reflecting object is the large vehicle, changes the target inclusion region between a target inclusion region for large vehicles and a target inclusion region for non-large vehicles, widths of the non-large vehicles being equal to or less than 1.8 m, the target inclusion region for large vehicles being a rectangle of 10 m long by 3.6 m wide, and the target inclusion region for non-large vehicles being a rectangle of 5 m long by 1.8 m wide.

4. The apparatus of claim 3, wherein the target inclusion region changing unit, when it is determined by the large-vehicle determination unit that the specific reflecting object is the large vehicle, changes the target inclusion region to the target inclusion region for large vehicles.

5. The apparatus of claim 1, wherein the large-vehicle determination unit determines whether or not the number of targets of the same-object target group is equal to or greater than a predetermined threshold target number for large-vehicle determination, and when it is determined that the number of targets of the same-object target group is equal to or greater than the predetermined threshold target number for large-vehicle determination, determines that the specific reflecting object is the large vehicle.

6. The apparatus of claim 1, wherein the large-vehicle determination unit determines whether or not a reflection wave received power for one of the targets of the same-object target group that fulfills a predetermined target selection condition for selecting a target used by the large-vehicle determination unit to determine whether or not the specific reflecting object is the large vehicle is equal to or greater than a predetermined threshold received power for large-vehicle determination, and when it is determined that the reflection wave received power for the target that fulfills the predetermined target selection condition is equal to or greater than the predetermined threshold received power for large-vehicle determination, determines that the specific reflecting object is the large vehicle.

7. The apparatus of claim 6, wherein the predetermined target selection condition states that the target used by the large-vehicle determination unit to determine whether or not the specific reflecting object is the large vehicle is a target of the same-object target group having a maximum frequency-peak intensity in the power spectrum.

8. The apparatus of claim 1, wherein the large-vehicle determination unit determines whether or not the number of targets of the same-object target group is equal to or greater than a predetermined threshold target number for large-vehicle determination, and when it is determined that the number of targets of the same-object target group is equal to or greater than the predetermined threshold target number for large-vehicle determination, further determines whether or not a reflection wave received power for one of the targets of the same-object target group that fulfills a predetermined target selection condition for selecting a target used by the large-vehicle determination unit to determine whether or not the specific reflecting object is the large vehicle is equal to or greater than a predetermined threshold received power for large-vehicle determination, and when it is determined that the reflection wave received power for the target that fulfills the predetermined target selection condition is equal to or greater than the predetermined threshold received power for large-vehicle determination, determines that the specific reflecting object is the large vehicle.

9. The apparatus of claim 8, wherein the predetermined target selection condition states that the target used by the large-vehicle determination unit to determine whether or not the specific reflecting object is the large vehicle is a target of the same-object target group having a maximum frequency-peak intensity in the power spectrum.

10. The apparatus of claim 1, wherein the predetermined same-object target selection condition comprises at least one of:
  a first condition that a difference in longitudinal position between the representative target and a target belonging to the specific reflecting object is less than a predetermined threshold value of longitudinal position difference;
  a second condition that a difference in lateral position between the representative target and a target belonging to the specific reflecting object is less than a predetermined threshold value of lateral position difference;
  a third condition that a difference in relative speed between the representative target and a target belonging to the specific reflecting object is less than a predetermined threshold value of relative speed difference; and
  a fourth condition that a difference in reflection wave received power between the representative target and a target belonging to the specific reflecting object is less than a predetermined threshold value of reflection wave received power difference.

11. The apparatus of claim 1, wherein the predetermined representative-target designation condition states that the representative target is a target, of the targets detected by the target detection unit, closest to the radar-mounting vehicle.

12. The apparatus of claim 1, wherein the predetermined representative-target designation condition states that the representative target is a target, of the targets detected by the target detection unit, having a maximum frequency-peak intensity in the power spectrum.

13. The apparatus of claim 1, wherein the target inclusive range of region is a rectangular region defined by a length along a traveling direction of the radar-mounting vehicle and a width along a vehicle-width direction of the radar-mounting vehicle.

* * * * *